ated Oct. 17, 1911.
UNITED STATES PATENT OFFICE.

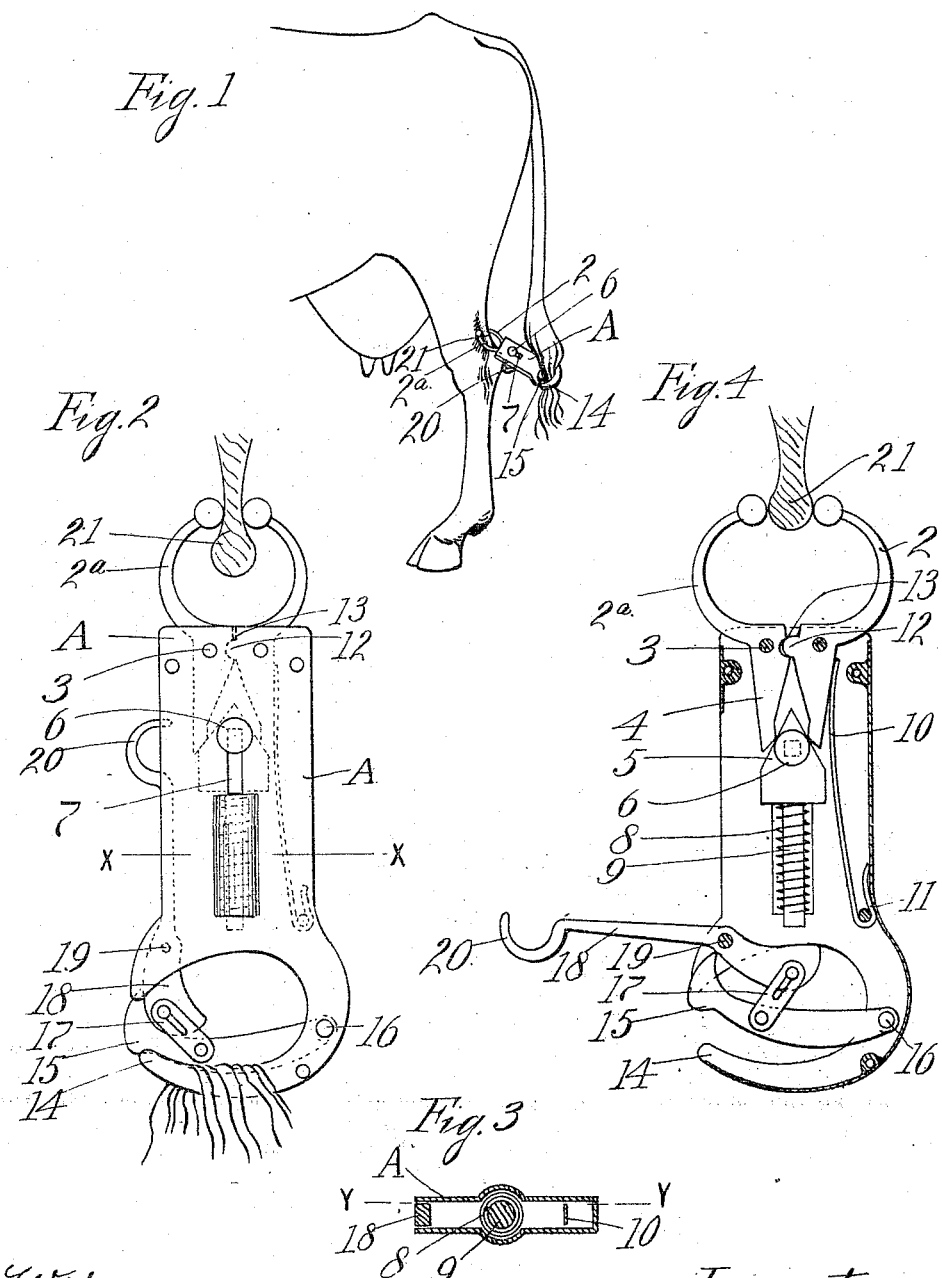

HERMAN C. MALMSTROM, OF HALLOCK, MINNESOTA.

COW-TAIL HOLDER.

1,006,109.  Specification of Letters Patent.  Patented Oct. 17, 1911.

Application filed April 10, 1909. Serial No. 489,151.

*To all whom it may concern:*

Be it known that I, HERMAN C. MALMSTROM, a citizen of the United States, residing at Hallock, in the county of Kittson and State of Minnesota, have invented certain new and useful Improvements in Cow-Tail Holders, of which the following is a specification.

My invention relates to improvements in devices for securing the free end of a cow's tail to her leg to hold the tail from interfering with the operation of milking.

To this end my invention consists in the features of construction, combination and arrangement of parts hereinafter particularly described and claimed.

In the accompanying drawings forming part of this specification, Figure 1 shows my invention in use; Fig. 2 is a plan view of the invention; Fig. 3 is a section on line $x$—$x$ of Fig. 2, and Fig. 4 is a section on line $y$—$y$ of Fig. 3.

In the drawings A represents the casing of the device within one end of which the curved jaws 2 and $2^a$ have pivotal supports 3. Slidable between the inner power arms 4 of the jaws 2 is the tapered spreader 5, the spreader being formed with a finger piece 6 extending outwardly through a slot 7 in one side wall of the casing. A coil spring 8 surrounds the stem 9 of the spreader and normally holds the spreader forced inwardly to separate the inner ends of the jaw and hold the outer ends of the jaw in the closed position shown in Fig. 2. The spreader acts against the tension of the strap spring 10 which is secured at one end 11 to the adjacent side wall of the casing and bears at its free end against the side of the power arm of the jaw member 2 as indicated in Fig. 2. In order to turn the jaw $2^a$ with the jaw 2 I form the jaw 2 with a bearing projection 12 fitting into a recess 13 in the jaw $2^a$ intermediate of the pivots 3. The opposite end of the device is formed with a hook portion 14 inside of which a jaw member 15 has pivotal support 16. The free end of the jaw 15 has sliding link connection 17 with the inner end of the lever arm 18. The lever 18 has fulcrum support 19 in the casing and is formed at its free end with a finger hold 20.

In use, the withdrawing of the spreader against the tension of its spring 8 will allow the jaws 2 and $2^a$ to be turned upon their pivots 3 into open position under the pressure of the spring 10. This allows the jaws to be slipped over the tendon 21 of the cow's leg, as indicated in Fig. 4. The spreader then being released will be carried into spreading position under the influence of the spring 8, carrying the jaws 2 and $2^a$ upon their supporting pivots 3 into the gripping position shown in Fig. 2. The free end of the cow's tail may be secured in the opposite end of the device by turning the arm 18 into the position shown in Fig. 4, carrying the jaw 15 inwardly away from the hook 14, the free end of the cow's tail then being inserted between the hook 14 and jaw 15, the actuating lever being turned upon its fulcrum to carry the hook 14 into gripping position with the lever 18 acting as a cam, as shown in Fig. 2.

I claim as my invention:

In a device of the class described carrying upon one end a pair of pivotally supported jaws, a bearing upon the inner side of one jaw fitting into a recess in the other jaw, a strap spring bearing against the outer side of one of said jaws for turning them upon their pivots through the medium of said bearing, gripping means carried by the other end of said device, and an actuating lever for said gripping means.

In testimony whereof I affix my signature in presence of two witnesses.

HERMAN C. MALMSTROM.

Witnesses:
 CHAS. I. MOORE,
 J. A. SWENSON.